United States Patent
Hsiao et al.

(10) Patent No.: US 8,194,147 B2
(45) Date of Patent: Jun. 5, 2012

(54) IMAGE PRESENTATION ANGLE ADJUSTMENT METHOD AND CAMERA DEVICE USING THE SAME

(75) Inventors: Wei-Chung Hsiao, Hsinchu (TW); Yu-Ling Fu, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 380 days.

(21) Appl. No.: 12/266,524

(22) Filed: Nov. 6, 2008

(65) Prior Publication Data

US 2010/0110211 A1   May 6, 2010

(51) Int. Cl.
*H04N 5/228* (2006.01)
(52) U.S. Cl. ............................ 348/222.1; 348/207.99
(58) Field of Classification Search ............... 348/222.1, 348/207.99
See application file for complete search history.

(56) References Cited

U.S. PATENT DOCUMENTS 6,148,149 A * 11/2000 Kagle .............................. 396/50
2007/0040810 A1* 2/2007 Dowe et al. ................... 345/173

FOREIGN PATENT DOCUMENTS

WO   2007/022259 A2   2/2007

* cited by examiner

*Primary Examiner* — Tuan Ho
*Assistant Examiner* — Antoinette Spinks (57) ABSTRACT

An image presentation angle adjustment method is provided for a camera device to process images through the method. An image presentation angle assigning device module is integrated in the camera device. When the camera device captures a target image, the image presentation angle assigning device will automatically or through the operation of a user generate an image orientation parameter associated with the target image. Furthermore, the captured target image is stored in an image file within the image storage memory of the camera device associated with the image orientation parameter. Accordingly, when the target image is opened by the user for display, the target image will be displayed in the orientation indicated the image orientation parameter for viewing convenience.

4 Claims, 12 Drawing Sheets

IMAGE PRESENTATION ANGLE ADJUSTMENT METHOD AND CAMERA DEVICE USING THE SAME

TECHNICAL FIELD

The present invention relates to an image processing method, and particularly an image presentation angle adjustment method and a camera device that uses the method to processes images.

BACKGROUND OF THE INVENTION

Normally, during using the digital video camera, making an example of the digital camera for capturing still images, the user usually will hold the camera upright for picturing, that is, the horizontal width is larger than the vertical height to be conformed with the physiological feature of human using both eyes to view the external objects for picturing. However, because sometimes the target object to be shot has larger height than width, or the view to be found has an angle with larger height than width, the digital camera will be rotated from the horizontal orientation status to the vertical orientation status for picturing. Due to the configuration of sensing elements in the digital camera, the captured image will become the horizontal orientation status when directly viewing using an ordinary computer image playing software. Therefore, the user will need to employ the counterclockwise or clockwise rotation function to rotate the pictures one by one and then to store, so that it is very inconvenient for the user to read and view the images.

In the prior art for image rotation, there are some related control techniques being developed. As for the patent technique, the R.O.C. patent publication no. I276042 discloses an automatic image rotation device and the implementation method thereof. In this patent, the automatic image rotation device comprises a load unit, a memory unit, a micro-controller, and a display unit; wherein, the micro-controller detects the image features in the image captured by the image capturing device and loaded by the load unit according to the feature recognition algorithm stored in the memory unit, and determines the image features in the image according to the feature recognition algorithm.

When the feature recognition algorithm determines the image features in the image are not upright, the micro-controller will rotate the images until the image features in the image becoming upright. Furthermore, the micro-controller will display the pictures on the display unit after rotating the images before rotating the images for preview. The automatic image rotation method includes a load step for loading an image, a detection step for detecting at least one image feature in the image, and a determination step for determining if the image features in the image are upright, and, if not, a rotation step for rotating the image until the image features in the image becoming upright.

However, in order to correctly observe the target image, it is necessary to rotate the electronic product for picturing during shooting to be conformed with the angular orientation of the target to be shot, or, in the previous case for the automatic image rotation device and the implementation method thereof, it employs the feature recognition algorithm stored in the memory unit to determine if there is any image feature contained in the target image, and then employs the determination step of the micro-controller to execute the rotation step for rotating the target image until the image features in the image are upright.

No matter rotating the electronic product for picturing to obtain the suitable shooting orientation angle or conducting multiple rotation on the image features contained in the target image with the micro-controller, it still needs to rotate the stored target images using the image features. And, the above-mentioned image features should at least include a human face feature, such as eyes, eyebrows, nostril, lips, ears and hairs. As for other images not including human face features, such as objects, devices and scenes, it could not be determined to execute the image rotation.

SUMMARY OF INVENTION

Thus, the present invention provides an image presentation angle adjustment method for camera device, which can capture the image following the image orientation predetermined by the user, and the user needs not the step of image rotation during viewing. Moreover, the present invention provides a picturing method, which can configure the predetermined image orientation according to the user's personal preference to capture the image containing image orientation data.

In order to solve the problems in the prior art, the present invention employs the technical means that the user can enable an image presentation angle assigning module during shooting the target image, and capture the target image with a predetermined image orientation into the camera device. The image presentation angle assigning module employs the touch screen to draw lines, operate the key set, or employs the gravity orientation sensing device to sense the gravity orientation to provide an image orientation parameter for the camera device. The image orientation parameter can be stored in the image parameter record of the image file, or stored in a parameter association file associated with the image file.

When the image sensing device of the camera device is capturing the target image, the target image will be stored in the image file in the form of image data, and the image data will be associated with the image orientation parameter, so that when the target image is read and opened for display, the image data can be presented in the orientation configured by the user for the convenience of the user to view.

In another embodiment, it can also adjust and change the coordinate parameter of the image data, so that when the target image is read and opened for display, the presentation orientation will also be changed.

With the technical means according to the present invention, the user can employ the image presentation angle adjustment method of the camera device according to the present invention to operate the image presentation angle assigning module, so that the user can capture the image following the predetermined image orientation; and, by attaching the predetermined image orientation during shooting into the image file or adjusting and changing the coordinate parameter of the image data, so that, during viewing the image file, they can be directly displayed on the screen according to the predetermined image orientation for shooting without additional image processing software to manually rotate the image orientation, or, without the previously mentioned image processing on the image features contained in the image through multiple image rotation steps.

Furthermore, the image presentation angle adjustment method for camera device according to the present invention can provide the user with the picturing method for configuring the predetermined image orientation by himself according to the user's preference. In the embodiment of the image presentation angle assigning function according to the present invention, the user employs the touch action to operate one side of the square frames of the touch screen to draw a line on the edge or select one side of the selected frame as the default bottom edge, or, as mentioned in another embodiment of the present invention, the gravity orientation sensing device will provide the predetermined shooting reference orientation.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF PREFERRED EMBODIMENTS

Reference will now be made in detail to the present preferred embodiments of the invention, examples of which are illustrated in the accompanying drawings. Wherever possible, the same reference numbers are used in the drawings and the description refers to the same or the like parts.

Figure 1:
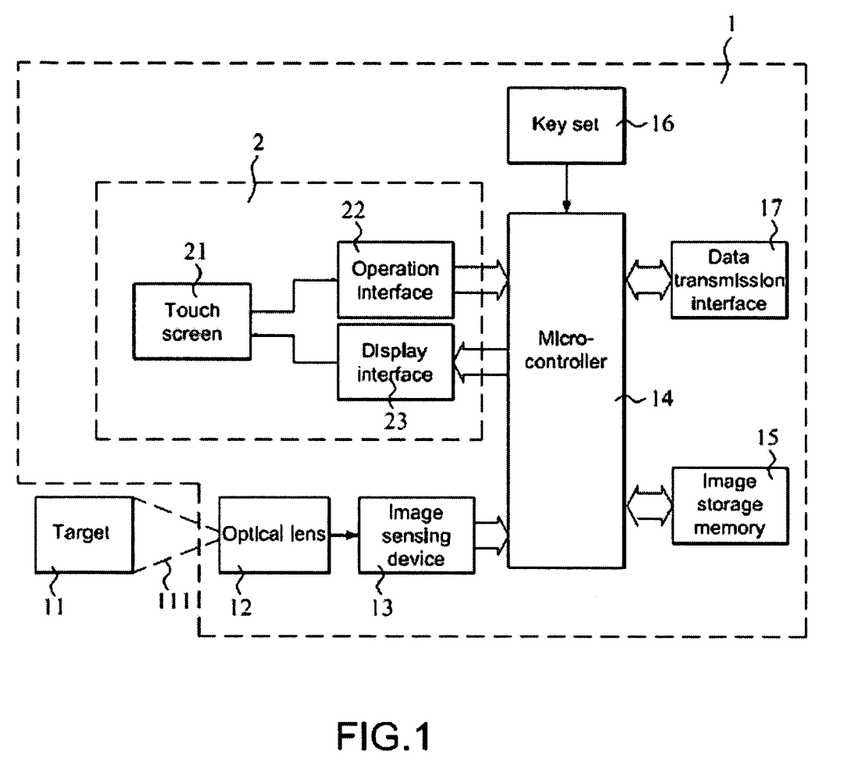
FIG. 1 is a system diagram of a camera device for the first embodiment according to the present invention.

Please refer to FIG. 1, which shows a system diagram of a camera device for the first embodiment according to the present invention. The camera device 1 of the present invention comprises an optical lens 12, an image sensing device 13, a micro-controller 14, an image storage memory 15, a key set 16, a data transmission interface 17, and an image presentation angle assigning module 2 electrically connected to the camera device 1.

The image sensing device 13 of the camera device 1 is aiming at the target 11 to be shot. The target image 111 will be sensed by the image sensing device 13 through the optical lens 12. The image sensing device 13 may be a charge coupling device (CCD) or a complimentary metal oxide semiconductor device (CMOS). The image sensing device 13 will transmit the sensed target image 111 to the micro-controller 14, and the micro-controller 14 will store it into an image file d1 in the image storage memory 15. The micro-controller 14 will output the image file d1 in the image storage memory 15 through the data transmission interface 17.

In an embodiment, the image presentation angle assigning module 2 comprises a touch screen 21, and the touch screen 21 may be a resistance-type, capacitance-type, or other types of touch screen. The touch screen 21 is electrically connected to the micro-controller 14 of the camera device 1 through an operation interface 22 and a display interface 23.

Figure 2:
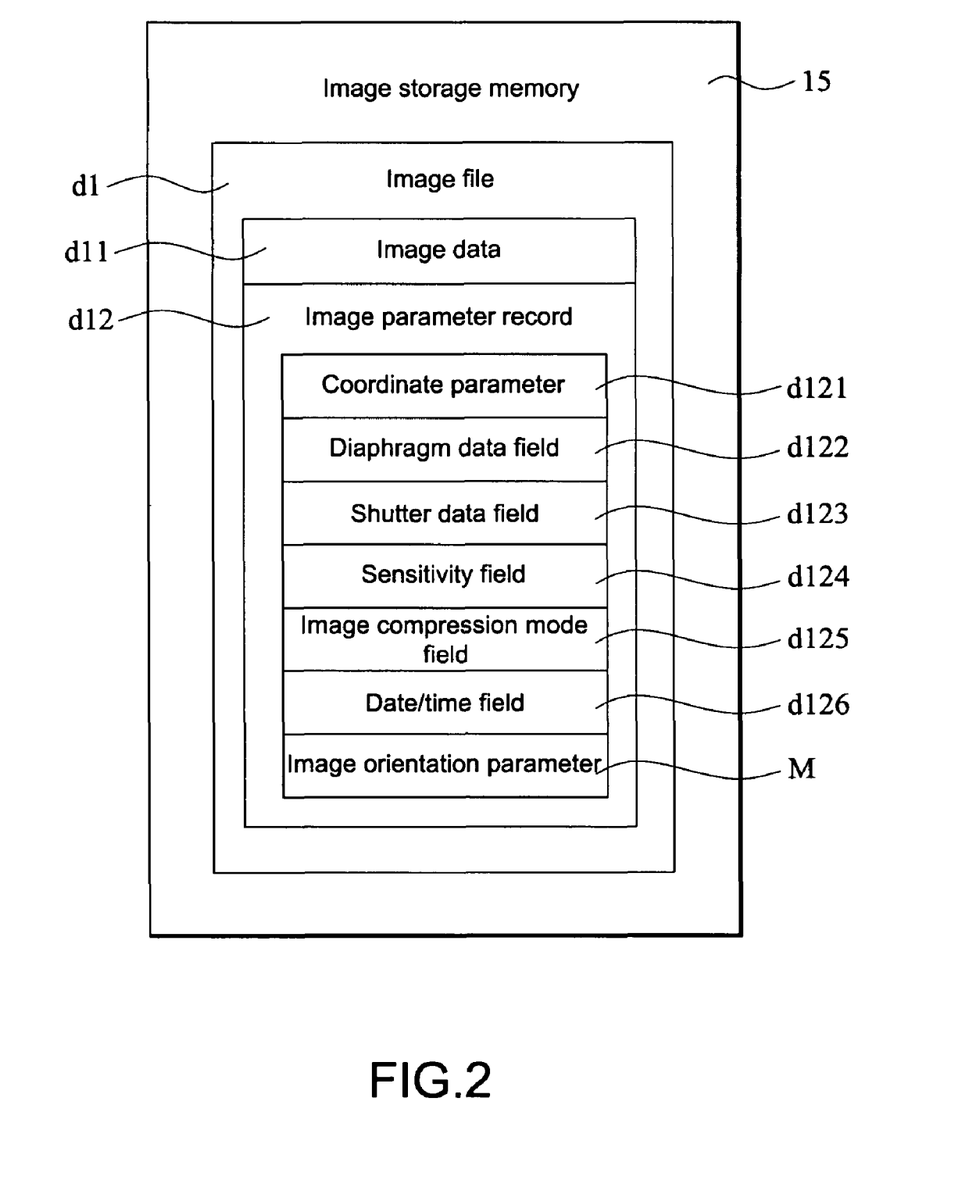
FIG. 2 is a diagram for an image storage memory in connection with the camera device of FIG. 1.

FIG. 2 is a diagram for an image storage memory in connection with the camera device of FIG. 1. The image storage memory 15 can store the image file d1, and the data in the image file d1 is composed of the image data d11 and the image parameter record d12. The image parameter record d12 includes various associated parameter fields during image shooting, such as coordinate parameter d121, diaphragm data field d122, shutter data field d123, sensitivity field d124, image compression mode field d125, and date/time field d126.

The coordinate parameter d121 is recorded with the X, Y coordinates for each pixel composing the image data d11 in the image file d1; that is, when the user employs the camera device for picturing, and the imaging formed on the camera body with the CCD or CMOS in the fixed horizontal and vertical correspondence. Each pixel will have the corresponding X and Y coordinate positions stored in the coordinate parameter d121.

The image parameter record d12 further includes an image orientation parameter M. When the user employs the camera device for picturing, the user can operate the touch screen 21, and activate the image presentation angle assigning function on the camera device 1 to generate the image orientation parameter M. The user can also operate the key set 16 to activate the image presentation angle assigning function of the camera device 1 to generate the image orientation parameter M, and also can employ the system configuration function on the screen commonly applied in the current digital camera to complete the advanced configuration in a touch manner to activate or close the image presentation angle assigning function.

Figure 3:
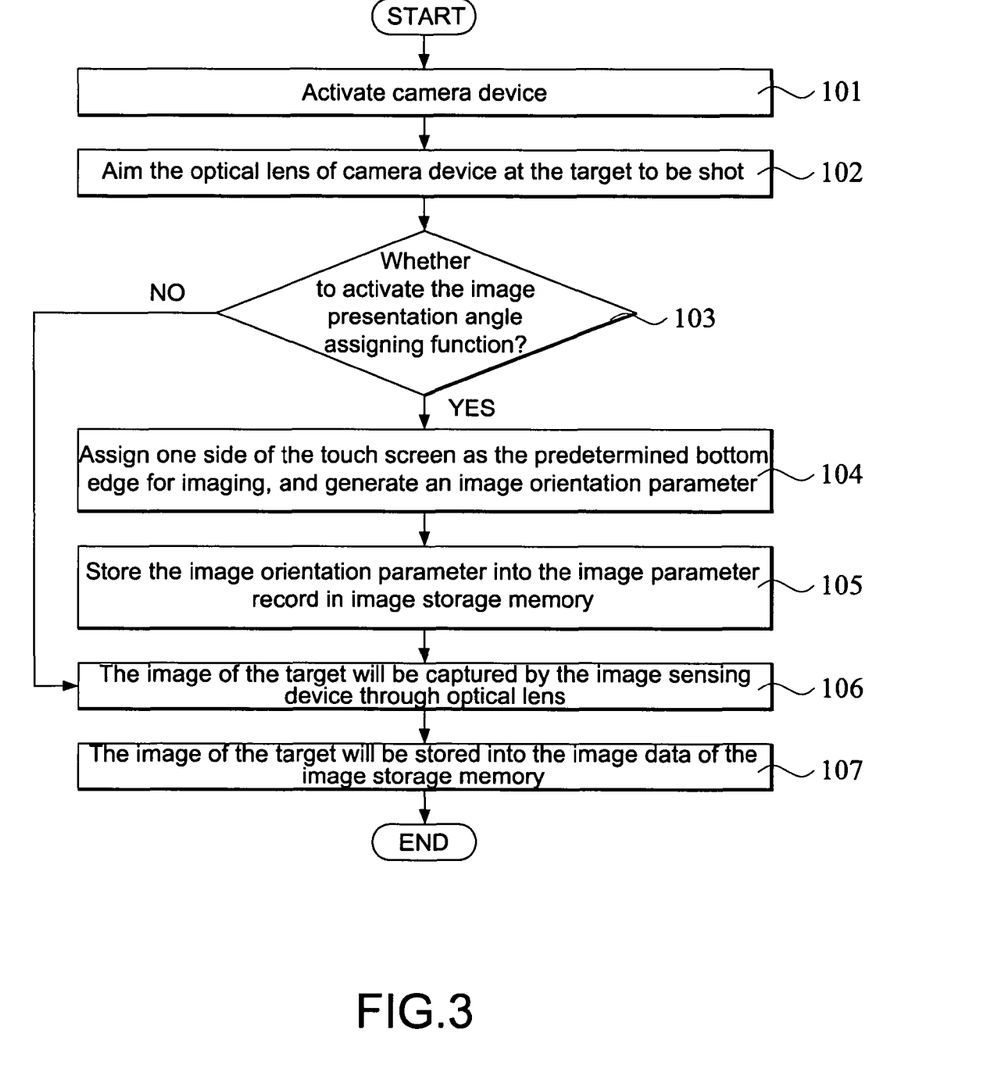
FIG. 3 is an operating flow chart in connection with the camera device in FIG. 1.

Please refer to FIG. 3, which shows is an operating flow chart in connection with the camera device in FIG. 1; in which, first activating the camera device (Step 101), which aims the optical lens of the camera device at the target to be shot (Step 102); the user can select whether to activate the image presentation angle assigning function (Step 103) based on the requirement; if so, continuing on Step 104; and, if the user selects not to activate the image presentation angle assigning function of the camera device, directly continuing on Step 106.

After the user activated the image presentation angle assigning function, the user can have touch operations, such as touching one side of the touch screen 21 of the camera device, for example the long side of the touch screen, to horizontally draw a line, or select one side of the touch screen, so as to select the side of the periphery frame on the touch screen 21 as the predetermined bottom edge for imaging. With the action of assigning the predetermined bottom edge by the touch operation, the touch screen 21 will generate an image orientation parameter M to the micro-controller 14 (Step 104), and the micro-controller 14 will store the image orientation parameter M into the image parameter record d12 in the image storage memory 15 (Step 105).

Then, the image caused by aiming the optical lens 12 on the target 11 to be shot will be captured by the image sensing device 13 through the optical lens 12 (Step 106); and, under the control of the micro-controller 14, storing into the image record d11 in the image storage memory 15 (Step 107), and the image data d11 is associated with the image orientation parameter M in the image parameter record d12.

With the image presentation angle adjustment method for the camera device designed by the present invention, when the target image captured by selecting to activate the image presentation angle assigning function will be read and opened to display on the screen by like the image viewing program on the computer device, the image viewing program will not only open and display the image data d11 in the image file d1, but also read the image orientation parameter M in the image parameter record d12 to determine the presentation angle for the image data d11. This is sometimes called "virtual rotation". For example, if the user is to horizontally draw a line on the long side of the touch screen 21 to assign the long side as the predetermined bottom edge for imaging, the image read and displayed on the screen will always use the long side as the bottom edge to be imaged on the display screen for the convenience of the user to view, no matter shooting with the long side of the touch screen as the bottom edge (shot in the horizontal orientation) or with the short side as the bottom edge (shot in the vertical orientation).

Figure 4:
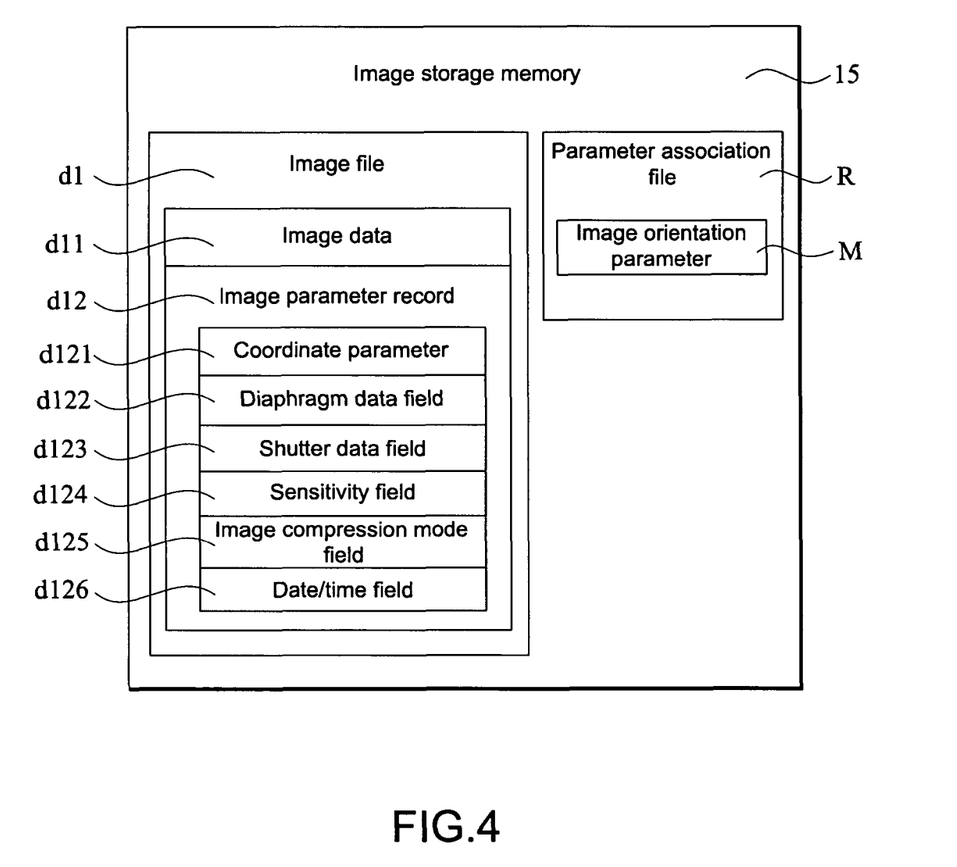
FIG. 4 is a diagram of an image storage memory for a second embodiment of the present invention in connection with the camera device of FIG. 1.
Figure 5:
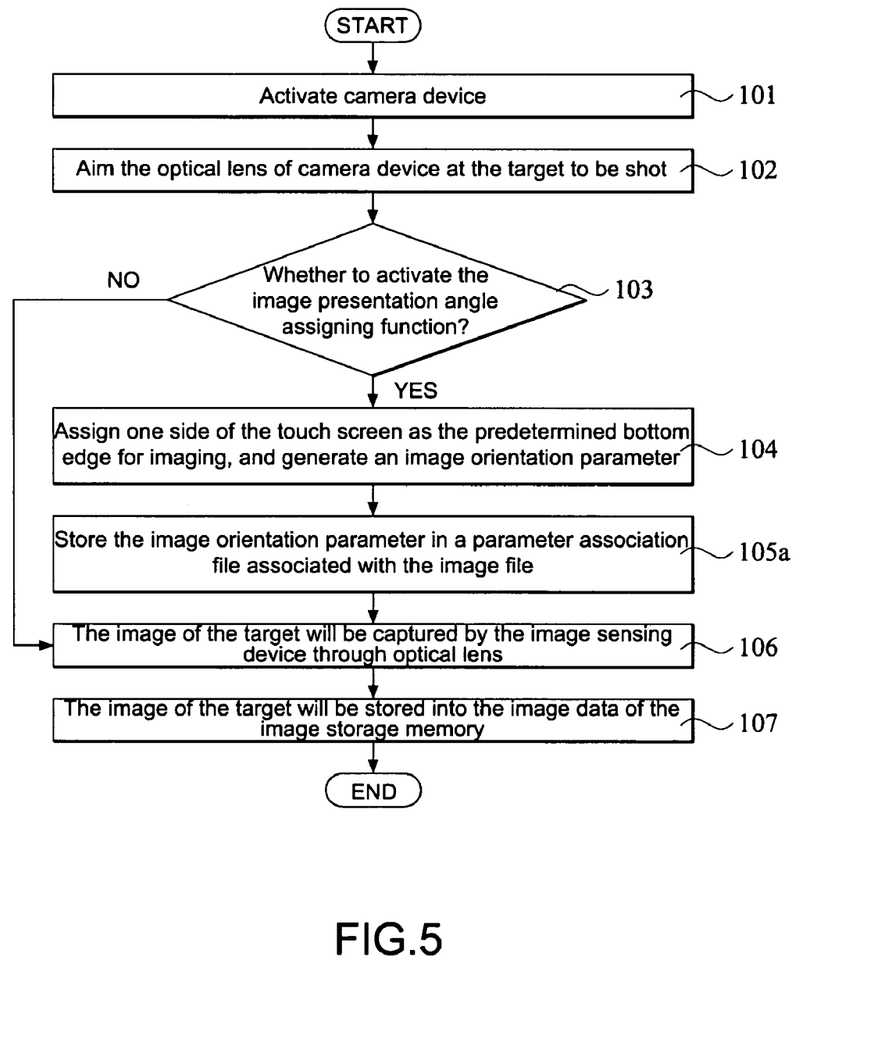
FIG. 5 is an operating flow chart of the second embodiment in connection with the camera device of FIG. 1.

Please refer to FIG. 4 and FIG. 5; wherein FIG. 4 is a diagram of an image storage memory for a second embodiment of the present invention in connection with the camera device of FIG. 1, and FIG. 5 an operating flow chart of the second embodiment in connection with the camera device of FIG. 1. As shown in the flow chart, most steps are identical to the flow chart shown in FIG. 3, so the identical steps are labeled with the same step number.

In the flow chart shown in FIG. 3, Step 105 will store the image orientation parameter M provided by the image presentation angle assigning function into the image parameter record d12 in the image file d1. In the flow chart shown in FIG. 5, the image orientation parameter M in Step 105a will be additionally stored in a parameter association file R associated with an image file d1, as shown in FIG. 4.

Figure 6:
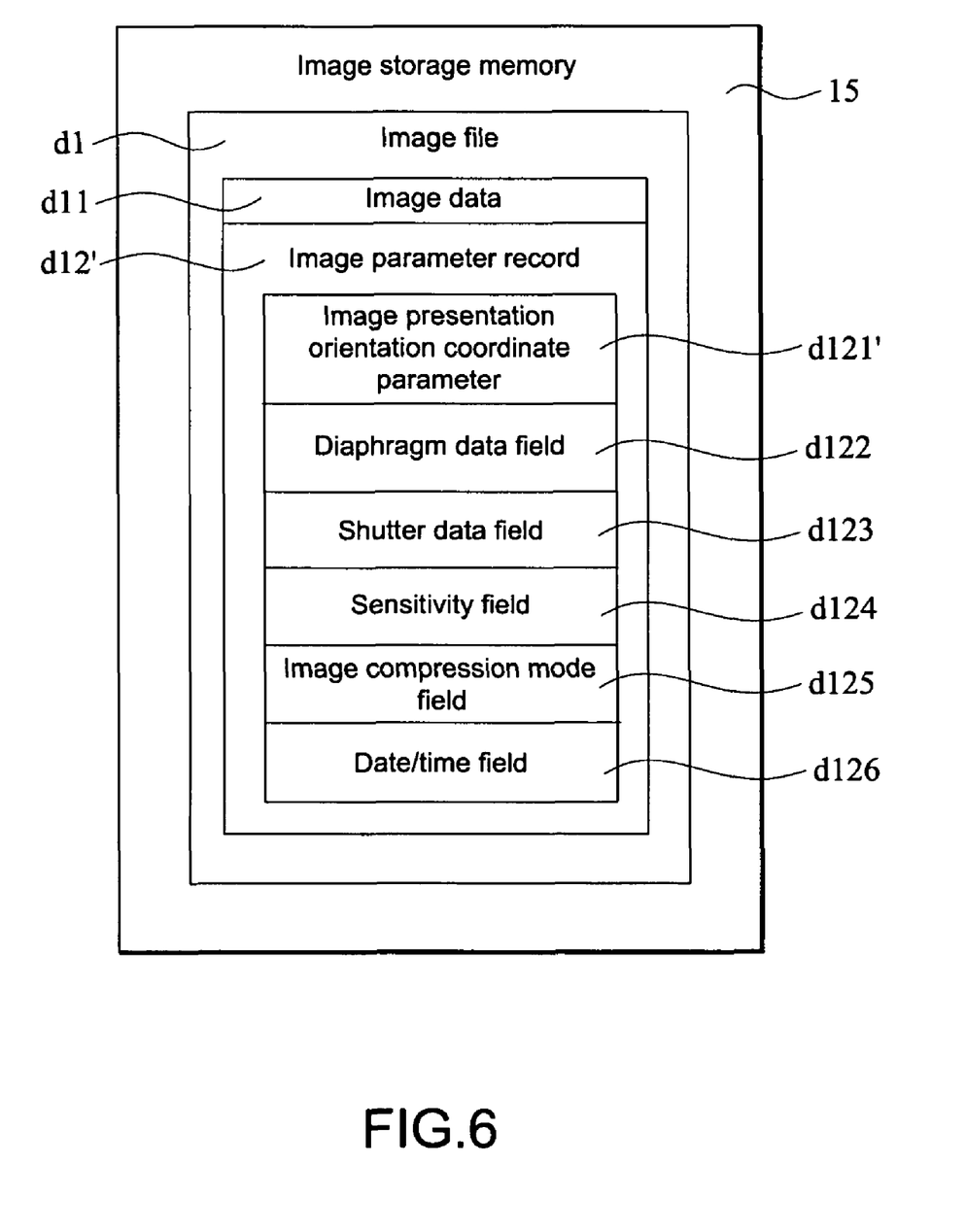
FIG. 6 is a diagram for an image storage memory of a third embodiment of the present invention in connection with the camera device of FIG. 1.
Figure 7:
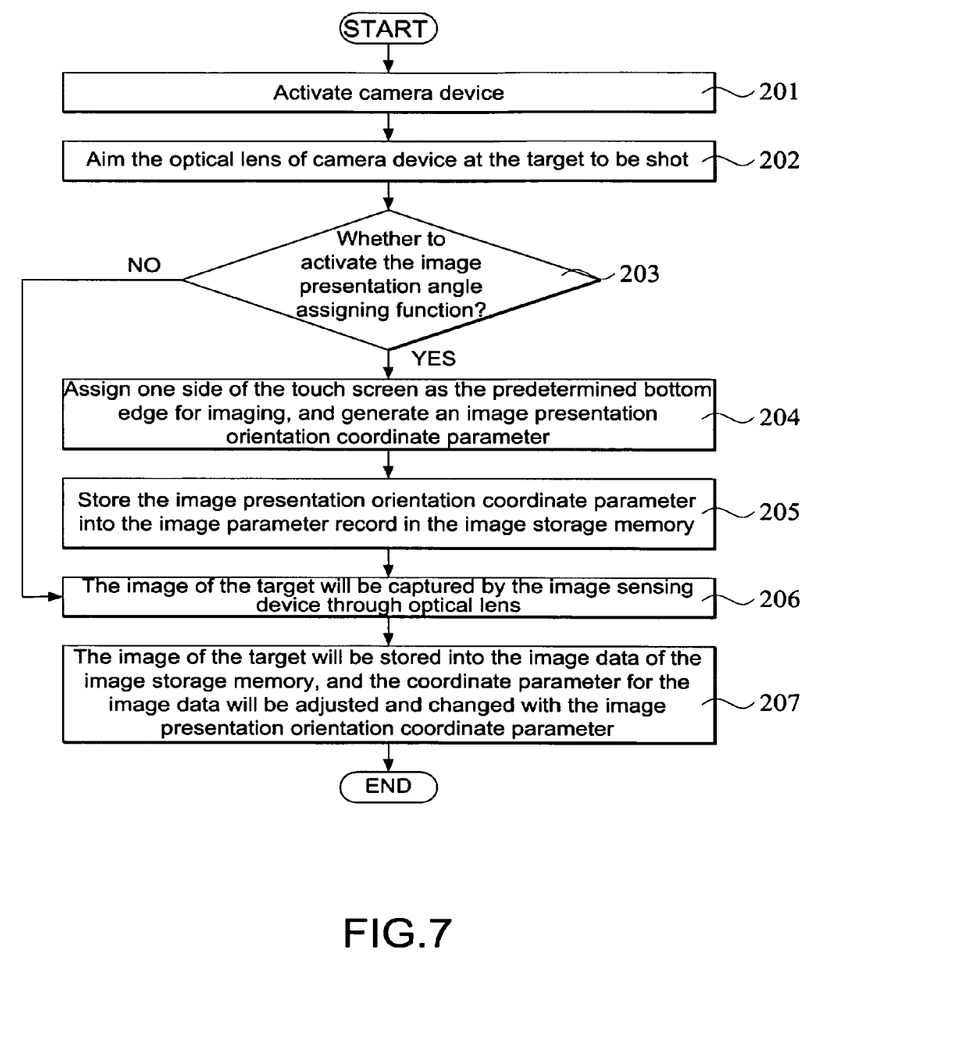
FIG. 7 is an operating flow chart of the third embodiment of the present invention in connection with the camera device of FIG. 1.

Please refer to FIG. 6 and FIG. 7; wherein FIG. 6 is a diagram for an image storage memory of a third embodiment of the present invention as shown in connection with the camera device of FIG. 1, and FIG. 7 is an operating flow chart of the third embodiment of the present invention in connection with the camera device of FIG. 1. Similar to the embodiment shown in FIG. 2, the image storage memory 15 in the present embodiment is also stored with the image file d1, and the data in the image file d1 is composed of the image data d11 and the image parameter record d12'. The image parameter record d12' includes various parameter fields associated with image capturing, such as image presentation orientation coordinate parameter d121', diaphragm data field d122, shutter data field d123, sensitivity field d124, image compression mode field d125, and data/time field d126, but not including the image orientation parameter M as shown in FIG. 2.

The present embodiment will be described in connection with FIG. 1, FIG. 6 and FIG. 7; wherein, first, activating the camera device (Step 201); aiming the optical lens of the camera device at the target to be shot (Step 202); and the user can select whether to activate the image presentation angle assigning function based on the requirement (Step 203); if so, continuing on Step 204; and, if the user selects not to activate the image presentation angle assigning function of the camera device, directly continuing on Step 206.

After the user activated the image presentation angle assigning function, the user can have touch operations, such as touching one side of the touch screen 21 of the camera device, for example the long side of the touch screen, to horizontally draw a line, or select one side of the touch screen, so as to select the side of the periphery frame on the touch screen 21 as the predetermined bottom edge for imaging. With the action of assigning the predetermined bottom edge by the touch operation, the touch screen 21 will generate an image presentation orientation coordinate parameter d121' to the micro-controller 14 (Step 204), and the micro-controller 14 will store the image presentation orientation coordinate parameter d121' into the image parameter record d12' in the image storage memory 15 (Step 205).

Then, the image by aiming the optical lens 12 at the target 11 to be shot will be captured by the image sensing device 13 through the optical lens 12 (Step 206), and under the control of the micro-controller 14, storing into the image data d11 in the image storage memory 15 (Step 207); and, the coordinate parameter of the image data d1 will be adjusted and changed with the image presentation orientation coordinate parameter d121' in the image parameter record d12'.

Thus, when the image data d11 is following read and opened to be displayed on the screen with like the image viewing program on the computer device, the image viewing program will not only open and display the image data d11 in the image file d1, the presentation orientation of the image data d11 will be adjusted and changed by the image presentation orientation coordinate parameter d121'. For example, if the user is to horizontally draw a line on the long side of the touch screen 21 to assign the long side as the predetermined bottom edge for imaging, the image read and displayed on the screen will always use the long side as the bottom edge to be imaged on the display screen for the convenience of the user to view, no matter shooting with the long side of the touch screen as the bottom edge (shot in the horizontal orientation) or with the short side as the bottom edge (shot in the vertical orientation).

Figure 8:
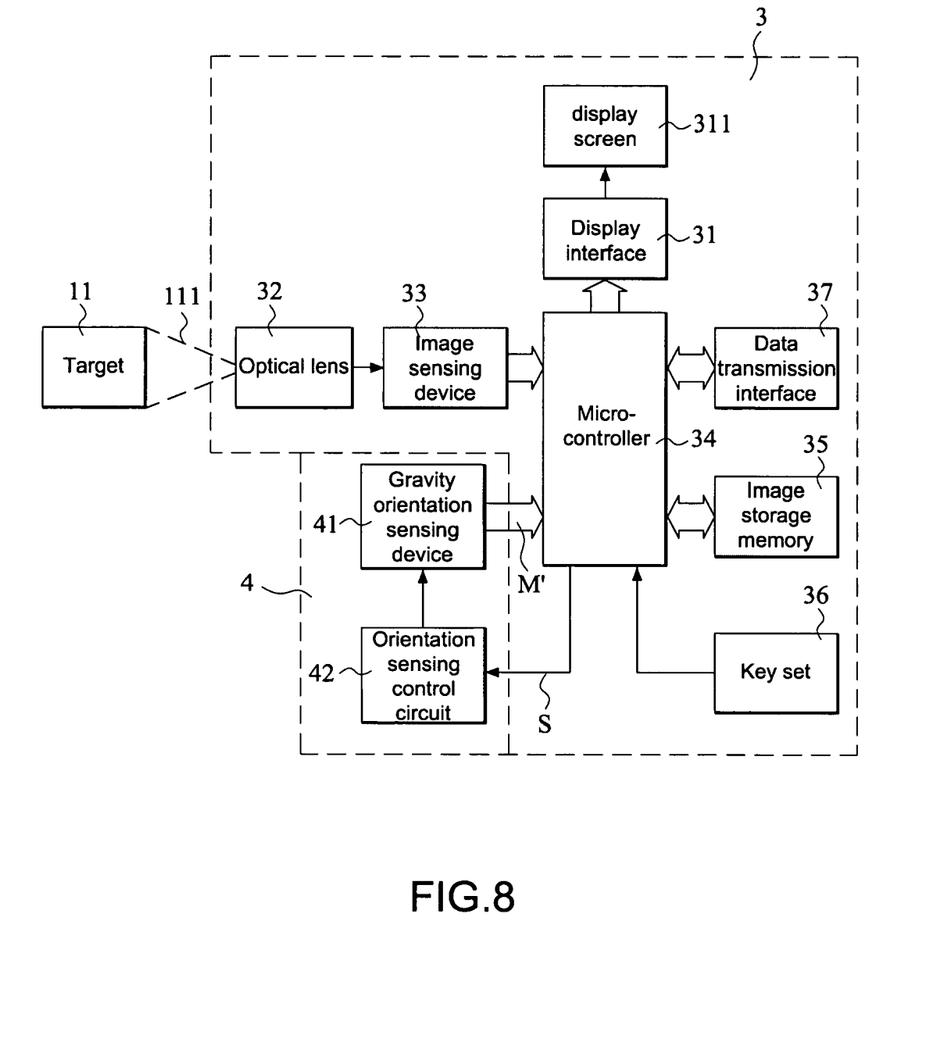
FIG. 8 is a system diagram of the second embodiment of the present invention.

Please refer to FIG. 8, which is a system diagram of the second embodiment of the present invention. The camera device 3 of the present embodiment comprises a display interface 31, a display screen 311, and an optical lens 32, an image sensing device 33, a micro-controller 34, an image storage memory 35, a key set 36 and a data transmission interface 37. The display screen 311 can receive the image signal sent by the micro-controller 34 through the display interface 31 to display the image.

The image presentation angle assigning module 4 is electrically connected to the camera device 3. In the embodiment, the image presentation angle assigning module 4 comprises a gravity orientation sensing device 41 and an orientation sensing control circuit 42. The gravity orientation sensing device 41 is electrically connected to the micro-controller 34 of the camera device 3.

The user can operate the key set 36 to make the micro-controller 34 generating a control signal S to be transmitted to the gravity orientation sensing device 41 through an orientation sensing control circuit 42 for controlling and activating the gravity orientation sensing device 41, so that the camera device 3 can activate and execute the image presentation angle assigning function. The user can also employs the system configuration function on the screen commonly applied in the current digital camera to use the touch manner to complete the advanced configuration to activate or close the image presentation angle assigning function.

Figure 9:
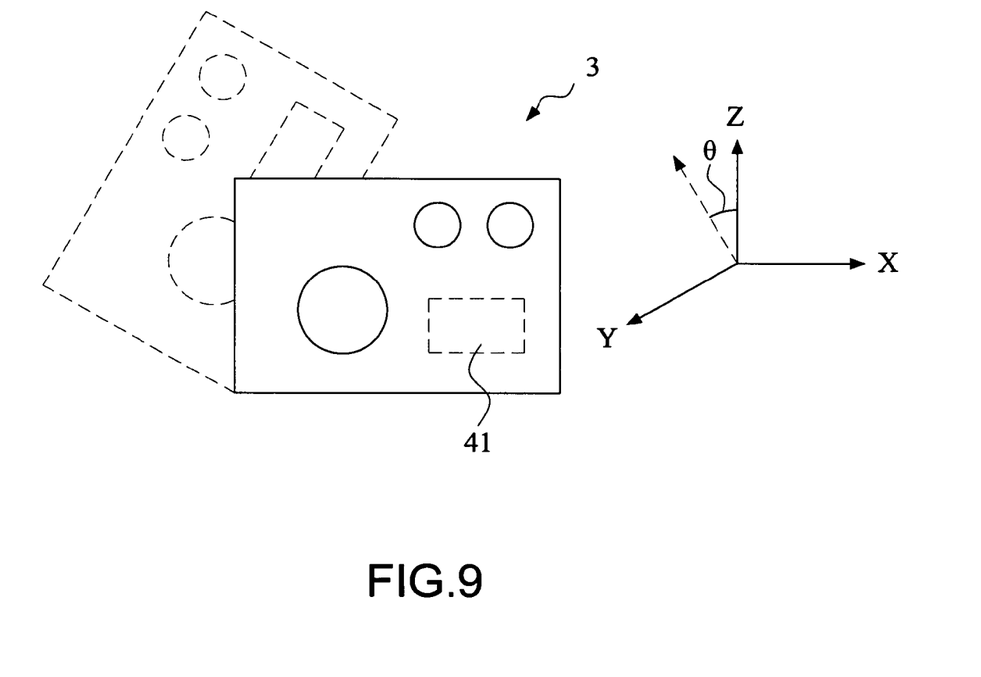
FIG. 9 is an explanatory diagram of the gravity orientation sensing device in FIG. 8 when sensing the shoot angle of the camera device configured by the user.

The gravity orientation sensing device 41 can sense the gravity orientation and generate an image orientation parameter M'. When the user aims the camera device 3 at the target 11, the gravity orientation sensing device 41, such as a 3-D gravity sensing device, will employ the user's handheld shooting orientation to sense the shooting angle θ of the camera device 3 (as shown in FIG. 9) to generate the image orientation parameter M'. The image orientation parameter M' can be stored in the image parameter record d12 of the image storage memory 15, as shown in FIG. 2, and can be stored in a parameter association file R associated with the image file d1 in the image storage memory 15, as shown in FIG. 4.

The gravity orientation sensing device 41 may be a single-axis, a dual-axis, or a triple-axis gravity orientation sensing unit, and may also include a conventional gyroscope to sense the real-time orientation of the camera device 3.

Figure 10:
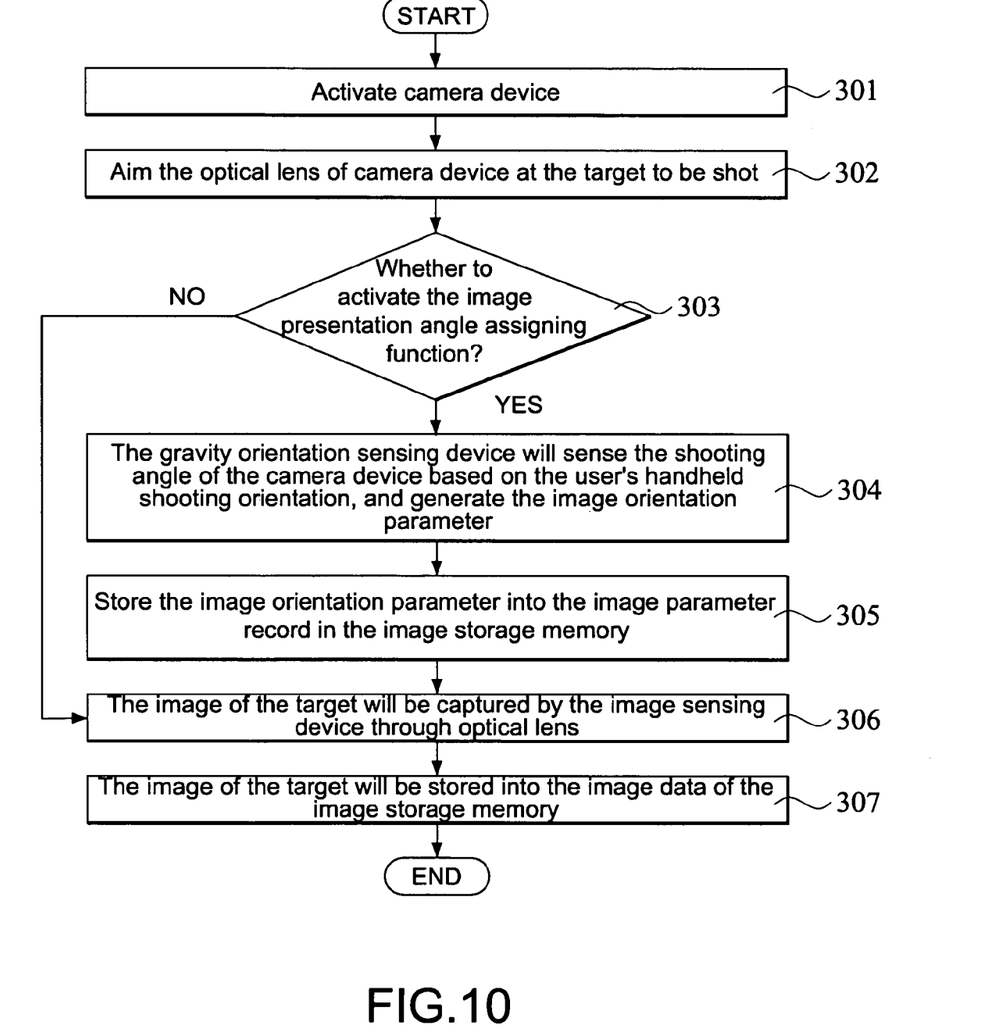
FIG. 10 is an operating flow chart of the second embodiment of the present invention in connection with the camera device of FIG. 8.

Please refer to FIG. 10, which shows an operating flow chart of the second embodiment of the present invention in connection with the camera device of FIG. 8. The present embodiment will be described in connection with FIG. 8, FIG. 9 and FIG. 10; wherein, first, activating the camera device (Step 301); aiming the optical lens of the camera device at the target to be shot (Step 302); and the user can select whether to activate the image presentation angle assigning function based on the requirement (Step 303); if so, continuing on Step 304; and, if the user selects not to activate the image presentation angle assigning function of the camera device, directly continuing on Step 306.

After the user activated the image presentation angle assigning function, the gravity orientation sensing device 41 will sense the shooting angle θ of the camera device 3 based on the user's handheld shooting orientation, and generate the image orientation parameter M' to the micro-controller 34 (Step 304). The micro-controller 34 will store the image orientation parameter M' into the image parameter record d12 in the image storage memory 15 as shown in FIG. 2 (Step 305).

Then, the image by aiming the optical lens 12 at the target 11 to be shot will be captured by the image sensing device 13 through the optical lens 12 (Step 306), and under the control of the micro-controller 14, storing into the image data in the image storage memory 15 (Step 307).

Figure 11:
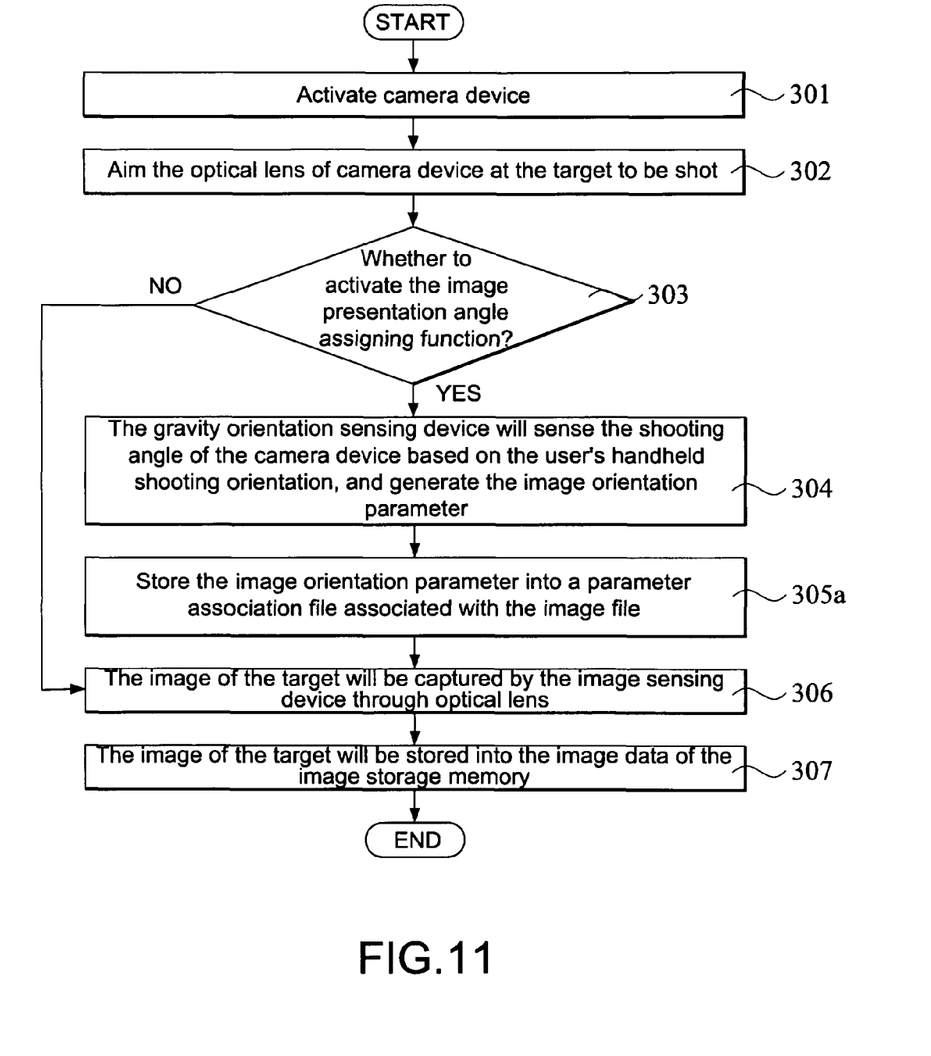
FIG. 11 is an operating flow chart of the second embodiment of the present invention in connection with the camera device of FIG. 8; and, FIG. 12 is an operating flow chart of the third embodiment of the present invention in connection with the camera device of FIG. 8.

Please refer to FIG. 11, which shows an operating flow chart of the second embodiment of the present invention in connection with the camera device of FIG. 8. In the flow chart, most steps are identical to the flow chart shown in FIG. 10, so the identical steps are labeled with the same step number.

In the flow chart shown in FIG. 10, the image orientation parameter M' in Step 305 will be stored in the image parameter record d12 of the image file d1. And, in the flow chart of FIG. 11, the image orientation parameter M' in Step 305a will be additionally stored in a parameter association file R associated with an image file d1, as shown in FIG. 4.

Figure 12:
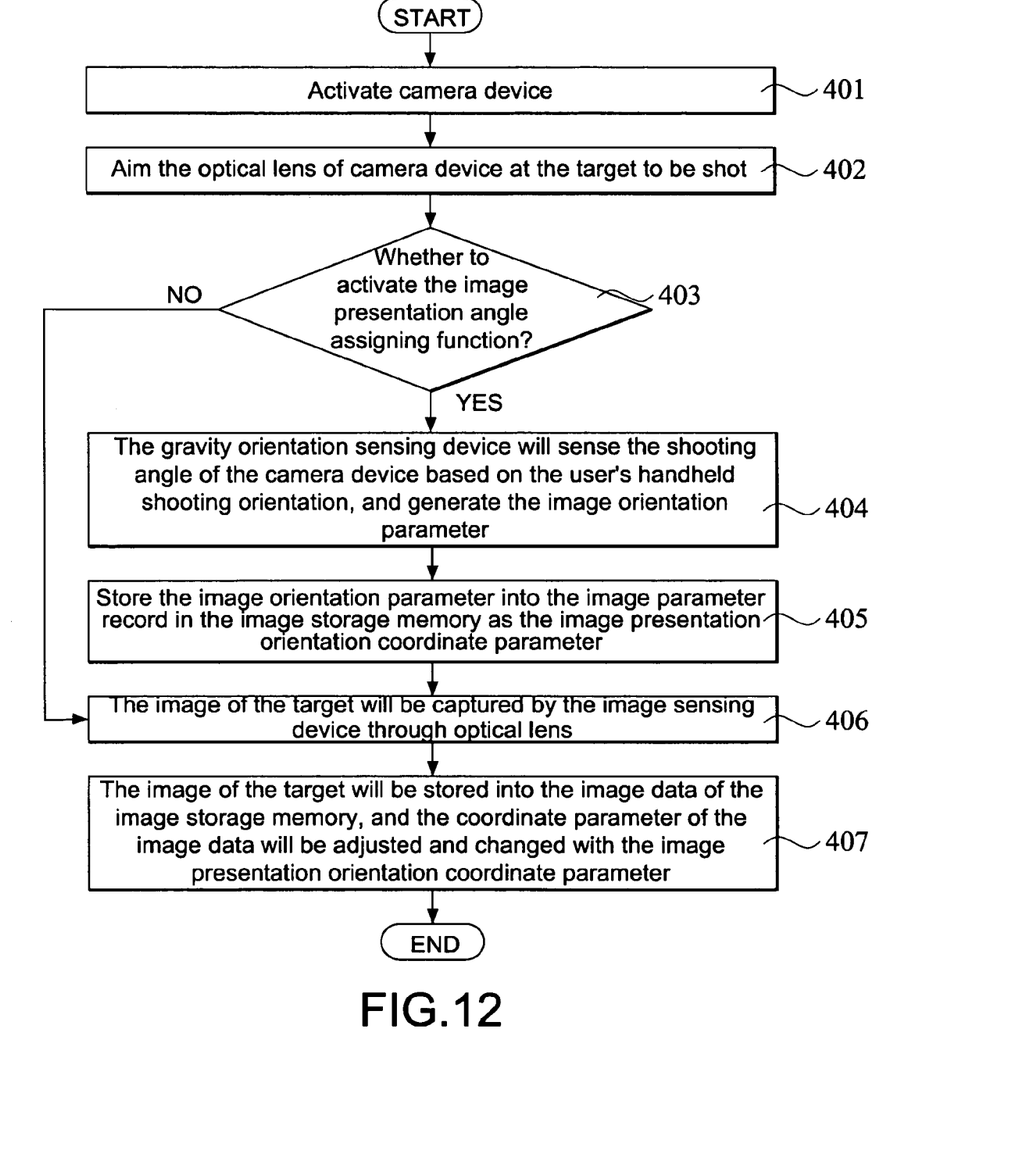

Please refer to FIG. 12, which shows an operating flow chart of the third embodiment of the present invention in connection with the camera device of FIG. 8. Similar to the embodiment shown in FIG. 6, the image storage memory 15 of the present embodiment will be stored with the image presentation orientation coordinate parameter d121', and the image presentation orientation coordinate parameter d121' is generated by the gravity orientation sensing device 41 in FIG. 8.

The present embodiment will be described in connection with FIG. 6, FIG. 8 and FIG. 12; wherein, first, activating the camera device (Step 401); aiming the optical lens of the camera device at the target to be shot (Step 402); and the user can select whether to activate the image presentation angle assigning function based on the requirement (Step 403); if so, continuing on Step 404; and, if the user selects not to activate the image presentation angle assigning function of the camera device, directly continuing on Step 406.

After the user activated the image presentation angle assigning function, the gravity orientation sensing device 41 will employ the user's handheld shooting orientation to sense the shooting angle θ of the camera device 3 to generate the image orientation parameter M' to the micro-controller 34 (Step 404). The micro-controller 34 will store the image orientation parameter M' into the image parameter record d12 in the image storage memory 15 shown in FIG. 6 as the image presentation orientation coordinate parameter d121' (Step 405).

Then, the image by aiming the optical lens 12 at the target 11 to be shot will be captured by the image sensing device 13 through the optical lens 12 (Step 406), and under the micro-controller 14, storing into the image data d11 in the image storage memory 15 (Step 407), and the coordinate parameter for the image data d1 will be adjusted and changed with the image presentation orientation coordinate parameter d121'.

As a brief for the image presentation angle adjustment method disclosed above, the method is adapted to a camera device and comprises the steps. First of all, activate the camera device that comprises a micro-controller, an image sensing device, an image storage memory and an image presentation angle assigning module. Then, capture a target image by the image sensing device; the target image is stored into an image file in the image storage memory. Afterwards, the image presentation angle assigning module provides an image orientation parameter associated with the target image. Finally, store the image orientation parameter into the image storage memory associated with the image file. The steps included in the method of the present invention do not necessarily follow all the sequences disclosed in the embodiments above. As long as the captured target image can be stored associated with the image orientation parameter and the image file can be displayed in the orientation indicated by the image orientation parameter, the sequences of the method are not essential to achieve the designated effects.

As a brief for the camera equipped with the image presentation angle adjustment function disclosed above, the camera device comprises: a micro-controller; an image sensing device electrically connects to the micro-controller and captures a target image; an image storage memory electrically connects to the micro-controller; and an image presentation angle assigning module electrically connects to the micro-controller and provides an image orientation parameter associated with the target image; wherein the captured target image is stored in an image file within the image storage memory associated with the image orientation parameter.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. An image presentation angle adjustment method adapted to a camera device, comprising the steps of:

activating the camera device, the camera device comprising a micro-controller, an image sensing device, an image storage memory and an image presentation angle assigning module, wherein the image presentation angle assigning module comprises a touch screen;

generating an image orientation parameter or an image presentation orientation coordinate parameter to be associated with a target image by drawing a straight line along one side of the touch screen;

then capturing the target image by the image sensing device, transmitting the target image to the micro-controller by the image sensing device, the target image being stored into an image file in the image storage memory by the micro-controller, the micro-controller outputting the image file via a data transmission interface; and storing the image orientation parameter or the image presentation orientation coordinate parameter into the image storage memory associated with the image file, wherein the image orientation parameter or the image presentation orientation coordinate parameter is stored in an image parameter record of the image file or a parameter association file associated with the image file or both.

2. The image presentation angle adjustment method of claim 1, wherein the image orientation parameter or the image presentation orientation coordinate parameter assigns the side of the touch screen along which the straight line is drawn to be a bottom edge of the captured target image for purposes of display.

3. A camera device, comprising:

a micro-controller;

an image sensing device, being electrically connected to the micro-controller and capturing a target image;

an image storage memory electrically connected to the micro-controller; and an image presentation angle assigning module, being electrically connected to the micro-controller and providing an image orientation parameter or an image presentation orientation coordinate parameter associated with the target image, wherein the image presentation angle assigning module comprises a touch screen and is configured to generate the image orientation parameter or the image presentation orientation coordinate parameter by drawing a straight line along one side of the touch screen before the target image is captured;

wherein the captured target image is transmitted to the target image to the micro-controller by the image sensing device and stored in an image file within the image storage memory associated with the image orientation parameter or the image presentation orientation coordinate parameter by the micro-controller and wherein the micro-controller outs an image file via a data transmission interface; and wherein the image orientation parameter or the image presentation orientation coordinate parameter is stored in an image parameter record of the image file or a parameter association file associated with the image file or both.

4. The camera device of claim 3, wherein the image orientation parameter or the image presentation orientation coordinate parameter assigns the side of the touch screen along which the straight line is drawn to be a bottom edge of a captured target image for purposes of display.

* * * * *